(12) United States Patent
Gresch et al.

(10) Patent No.: US 9,861,023 B2
(45) Date of Patent: Jan. 9, 2018

(54) COMBINATION OF AN AGRICULTURAL TOWING VEHICLE AND A SEEDER

(71) Applicant: Deere & Company, Moline, IL (US)

(72) Inventors: Valentin Gresch, Ensheim (DE); David J. Rylander, Victoria, IL (US); Christian Waibel, Mannheim (DE); Martin Kremmer, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 3 days.

(21) Appl. No.: 14/939,568

(22) Filed: Nov. 12, 2015

(65) Prior Publication Data

US 2016/0128262 A1    May 12, 2016

(30) Foreign Application Priority Data

Nov. 12, 2014   (DE) .......................... 10 2014 223 095

(51) Int. Cl.
| | | |
|---|---|---|
| *A01C 7/20* | (2006.01) | |
| *A01B 59/06* | (2006.01) | |
| *A01B 63/11* | (2006.01) | |
| *A01C 7/00* | (2006.01) | |
| *A01B 63/10* | (2006.01) | |

(Continued)

(52) U.S. Cl.
CPC ............ *A01B 59/068* (2013.01); *A01B 63/10* (2013.01); *A01B 63/11* (2013.01); *A01B 63/111* (2013.01); *A01C 5/064* (2013.01); *A01C 7/006* (2013.01); *A01C 7/201* (2013.01); *A01C 7/203* (2013.01); *A01C 7/205* (2013.01); *Y02P 60/23* (2015.11)

(58) Field of Classification Search
CPC combination set(s) only.
See application file for complete search history.

(56) References Cited

U.S. PATENT DOCUMENTS

| | | | | |
|---|---|---|---|---|
| RE22,019 E | * | 2/1942 | Brown ................ | A01B 63/1115 172/298 |
| 6,105,679 A | * | 8/2000 | Schubert ................ | A01B 63/00 172/4 |
| 6,389,999 B1 | | 5/2002 | Duello | |

(Continued)

FOREIGN PATENT DOCUMENTS

| | | |
|---|---|---|
| DE | 3124737 | 1/1983 |
| DE | 204827 | 12/1983 |

(Continued)

OTHER PUBLICATIONS

European Search Report in foreign counterpart application No. 15192781.1, dated Mar. 30, 2016 (8 pages).

*Primary Examiner* — Alicia Torres

(57) ABSTRACT

A combination is made up of a tractor and a seeder suitable for direct drilling mounted on a three-point hitch of the tractor. The seeder has a crossbeam that is connected to the three-point hitch and on which a plurality of sowing units are arranged laterally in succession. The sowing units, each equipped with at least one furrow opener, are respectively prestressed downward in relation to the crossbeam by an actuator, and the three-point hitch can be self-locked in relation to a chassis of the tractor. During the sowing operation, the pressing forces for the furrow openers are therefore introduced via the sowing units, the actuator, the crossbeam and the three-point hitch into the chassis of the tractor.

1 Claim, 2 Drawing Sheets

(51) Int. Cl.
*A01B 63/111* (2006.01)
*A01C 5/06* (2006.01)

(56) References Cited

U.S. PATENT DOCUMENTS

| | | | |
|---|---|---|---|
| 8,850,997 B2 | 10/2014 | Silbernagel et al. | |
| 2001/0045294 A1* | 11/2001 | Mayerle | A01B 63/32 172/452 |
| 2002/0112864 A1* | 8/2002 | Scarlett | A01B 67/00 172/3 |
| 2008/0066934 A1* | 3/2008 | Hou | A01B 63/112 172/7 |

FOREIGN PATENT DOCUMENTS

| | | |
|---|---|---|
| EP | 0632953 A2 | 1/1995 |
| EP | 2517545 | 10/2012 |
| WO | 2009134144 A1 | 11/2009 |

\* cited by examiner

COMBINATION OF AN AGRICULTURAL TOWING VEHICLE AND A SEEDER

FIELD

The disclosure relates to a combination of a tractor and a seeder appropriate for direct drilling attached to a three-point hitch of the tractor.

BACKGROUND

Seeders suitable for direct drilling, which are designed for sowing on fields that have not first been prepared by cultivating implements, and on which plant stubble remaining from previous harvesting process and other impurities are present, require sufficient pressing forces for their furrow openers. These pressing forces are necessary in order to produce a sufficiently deep seed furrow and possibly a fertilizer furrow and to push aside or cut through the plant parts and other materials still present on the field.

In the prior art (cf. EP 2 517 545 A1, for example), such seeders suitable for direct drilling are generally equipped with a frame of their own, which is supported on wheels and pulled across the field by a towing vehicle (generally a tractor). A seed container, which supplies the individual sowing units supported on the frame, is mounted on the frame. The seed is transported pneumatically from the seed container to the sowing units. The seeder itself has a sufficiently high weight that it causes no problems to provide the forces necessary for introducing the furrow into the ground by means of springs and/or hydraulic or pneumatic actuators, which are arranged between the furrow opener (or a sowing unit, on which the furrow opener is mounted), and the frame. The force necessary for opening the furrow is transmitted by the spring or the actuator onto the frame of the seeder.

DD 204 827 A1 describes a seeder with spring-loaded sowing colters mounted on the three-point hitch of the tractor. The weight of the seeder is borne by wheels of the seeder during the sowing process. To increase the load on the front wheels of the tractor during the turning process or to adjust the pressing force of the sowing colter, the seeder can be pivoted forward and upward relative to the three-point hitch by means of a hydraulic cylinder. The pressing force for the sowing colter (not expressly suitable for direct drilling) is likewise provided by the of the seeder's own weight.

It is therefore considered undesirable that a high weight of the seeder itself was required in the prior art in order to provide the pressing force for the furrow opener. It would be desirable, however to provide a lighter-weight seeder, which is nevertheless suitable for direct drilling.

SUMMARY OF THE DISCLOSURE

This problem is solved by the teaching of Claim 1, while features that further develop the solution in an advantageous manner are specified in the additional claims.

A combination is made up of a tractor and a seeder suitable for direct drilling mounted on a three-point hitch of the tractor. The seeder has a crossbeam on which a plurality of sowing units are arranged laterally, one alongside another, and which is connected to the three-point hitch. The sowing units, each equipped with at least one furrow opener, are prestressed downward in relation to the cross beam by associated prestressing means. The three-point hitch is locked in relation to a chassis of the tractor.

This has the effect that when sowing, the pressing forces of the furrow opener are introduced via the sowing units, the prestressing means, the cross beam and the three-point hitch into the chassis of the tractor during the sowing operation. The seeder suitable for direct drilling, i.e. sowing on fields not previously prepared by cultivating equipment, thus uses the weight of the tractor for providing the pressing force of the furrow openers, so that the weight of the sowing machine itself can remain relatively low.

Said pretensioning means can be a spring and/or an actuator operated by a pressure medium, and can be, in particular, a hydraulic or pneumatic cylinder to which a predeterminable pressure can be applied, or a pneumatic (bellows) cylinder.

The three-point hitch can comprise a lower link that can be adjusted in height, i.e. raised and lowered, by means of a double-acting hydraulic cylinder, and the hydraulic cylinder can be locked by a valve during the sowing operation.

The seeder is preferably supported only on the three point hitch and optionally on depth-adjusting wheels of the seeder, but not on support wheels on the ground that are associated with the seeder.

The sowing units can each comprise a frame, on which a seed material container, the furrow opener, a depth adjusting wheel, a seed delivery device and a metering device are arranged, wherein the metering device is designed to successively remove seed material from the seed material container and supply it to the seed delivery device, which discharges the seed into a furrow produced by the furrow opener, the depth of which is determined by the depth-adjusting wheel.

The frame can be fastened to the cross beam by an parallelogram linkage comprising two links, and the prestressing means can be coupled to the linkage and the cross member.

DETAILED DESCRIPTION

Figure 1:
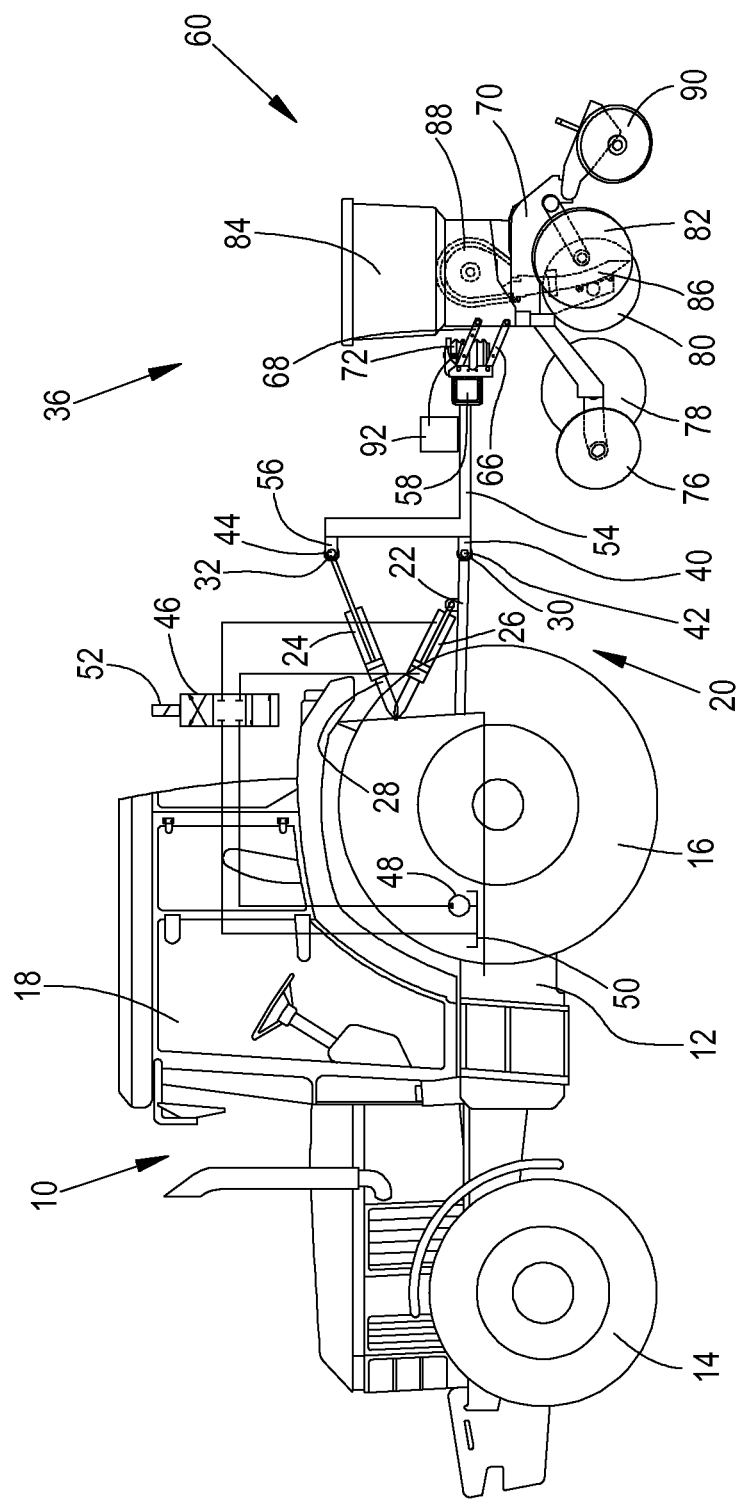
FIG. 1 shows a side view of a tractor with a seeder.
Figure 2:
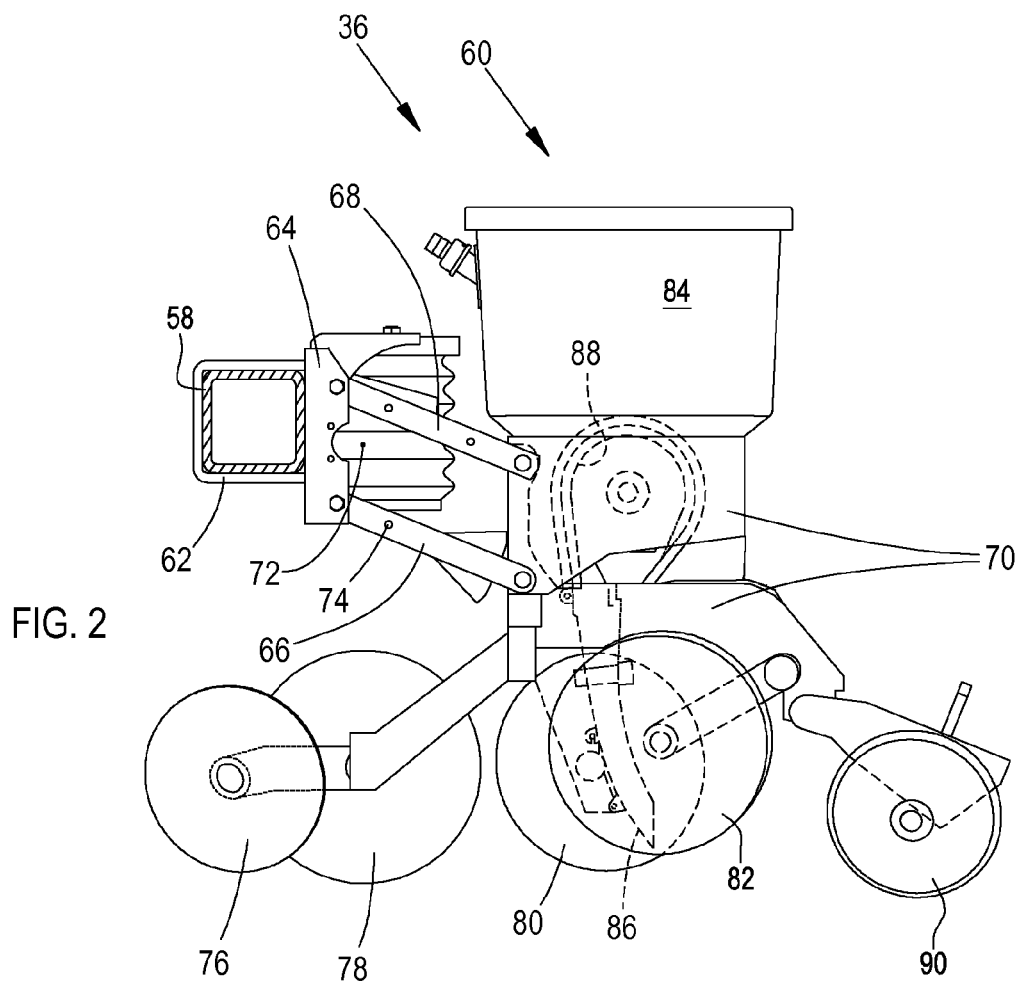
FIG. 2 shows an enlarged view of the seeder.

FIG. 1 shows a tractor 10, which is constructed on a chassis 12 and is supported on the ground by front wheels 14 and rear wheels 16. An operator work station is situated in a cab 18. A three-point hitch 20, which is composed of two lower links 22 arranged one alongside another and an upper link 28 mounted thereabove, is arranged at the rear end of the chassis 12. The lower links 22 are height-adjustable by means of associated double-acting hydraulic cylinders 26 that pivot the lower links 22 at their articulation points on the chassis 12 about horizontal axes extending approximately perpendicular to the forward direction. The upper link 28 is designed as a hydraulic cylinder 24 and is accordingly variable in length. By displacing the hydraulic cylinders 26, rear coupling points 30 of the lower links 22 can be brought into a position suitable for attaching the seeder 36. A rear coupling point 32 of the upper link 28 can be moved into a position suitable for attaching the seeder 36 by adjusting the length of the upper link 28, which can be done purely manually by means of a suitable threaded spindle instead of by the hydraulic cylinder 24. Lower link coupling points 30 in the form of upward-extending catch hooks (or any other desired coupling points such as coupling eyes as described in DIN ISO 730-1 Agricultural machines and tractors—Rear three-point attachment—Part 1: Categories 1, 2, 3 and 4) are arranged at the rear end of the lower link 22, while a likewise conventional upper link coupling point 32 is provided at the rear end of the upper link 28.

The double-acting hydraulic cylinders 26 of the lower links 22 are connected to a valve 46, which is in turn coupled to a hydraulic pump 48 driven by the engine of the tractor 10 and to a tank 50 for hydraulic fluid. The valve 46 can be connected to both hydraulic cylinders 26, or a separate valve 46 can be assigned to each hydraulic cylinder. The valve 46 can be brought into a closed position as shown, into a hitch-lowering position, if it is displaced upward as in FIG. 1, and into a hitch-raising position if it is displaced downward as in FIG. 1. The valve 46 can be actuated manually by the operator in the cab 18 or by suitable electromagnetic actuators 52, which are in turn operated by switches arranged in the cab 18 or by a headland automation unit (not shown). In the position of the valve 46 shown in FIG. 1, the oil flow in and out of the cylinder 26 is blocked and the three-point hitch is thus locked in position. The hydraulic cylinder 24 of the upper link 28 is used only for one-time initial adjustment of the position of the coupling point 32 and is not adjusted during field operation, but is instead locked (like the hydraulic cylinders 26 of the lower link 22, as shown in FIG. 1, by the valve 46). At the end of the field, the seeder 36 can be raised by bringing the valve 46 into the hitch-raising position by the operator or the headland automation unit, and before working the next track, can be analogously lowered by bringing the valve 46 into the hitch-lowering position by means of the operator or the headland automation unit. Thereby the lower links 22 are raised and again lowered by the hydraulic cylinders 26, whereby the seeder 36 is also raised and lowered.

The seeder 36 comprises a holding frame 54 that is fastened by lower bars 40 and bolts 42 to the lower link coupling points 30 of the lower links 22, and by an upper mounting element 56 and a bolt 44 to the upper link coupling point 32. A crossbeam 58, which extends over the entire length of the seeder 36 and on which a number of sowing units 60 are mounted, arranged one alongside another laterally, is fastened to the holding frame 54. The sowing units 60 are fastened to the cross beam 58 via U-shaped bolts 62, which are connected to a bracket 64 that extends vertically on the rear side of the crossbeam 58 and on which two links 66, 68 are pivotally mounted, one above another, which are also each pivotally mounted to a frame 70 of the sowing unit 60. Together with the bracket 64 and the frame 70, the links 66, 68 form a pivotal mounting of the frame relative to the crossbeam 58. A pneumatic actuator 72, which serves as a pretensioning means and is designed in the illustrated embodiment as a pneumatic bellows cylinder, engages at the top with the bracket 64 and at the bottom with the lower link 66 (at point 74) and defines the position of the frame 70 and the pressing force with which the furrow openers 78, 80 supported on the frame 70 interact with the ground. The pressure in the pneumatic actuator 72 is specified by a pneumatic control device 92, which can comprise a compressor and a pressure regulation valve. A hydraulic cylinder (not shown) could also be used in place of the pneumatic actuator 72 as well as one or more mechanical springs.

The frame 70 supports, in a conventionally known manner, a seed material container 84, a seed delivery device 86, which can be in the form of a gravity drop seed tube (as shown) or a mechanical delivery system, and a metering device 88 (such as, but not limited to, a vacuum seed meter shown), which discharges individual seeds one after another from the seed stored in container 84 into the sowing seed delivery device 86, which deposits it into a furrow that is produced by the furrow opener 80, the working depth of which is specified by a depth-adjusting wheel 82. The furrow is closed by a closing wheel 90. Another furrow can be produced by a furrow opener 78, the working depth of which is specified by a depth-adjusting wheel 76. This additional furrow can be used for depositing fertilizer into the soil, and can be likewise closed by the closing wheel 90. With regard to further details of the sowing units 60, the reader is referred to the disclosure of U.S. Pat. No. 8,850,997 B2 the disclosure of which is hereby incorporated by reference into the present documents.

The seeder 36 is supported only on the three-point hitch 20 and on the depth-adjusting wheels 80 of the sowing units 60, but not on the associated support wheels on the ground. As already mentioned, the seeder 36 is suitable for direct drilling, i.e. for working on fields not cultivated by cultivating machines after the previous harvest or only cultivated slightly. The furrow opener 80 therefore requires a sufficiently high pressing force in order to be able to cut through materials such as plant stems and stubble that may be present as well as to penetrate hardened soil. Since the actual seeder 36 is constructed relatively lightly, and has only a few and light elements, the furrow opener 80 is supported during operation on the chassis 12 of the tractor 10 via the frame 70, on which it is rotatably suspended, the lower link 66, the pneumatic actuator 72, the bracket 64, the mountings 62, the crossbeam 58, the holding frame 54, the upper and lower links 22, 28 and the hydraulic cylinders 26 of the lower links 22. The rear axle of the tractor 10 is therefore relieved and the front axle is loaded. As a result, there is no need for separate ballast weights, which otherwise (i.e. without the rigid connection according to the invention of the seeder 36 to the tractor 10) are necessary in order to ballast the seeder 36 to provide a pressing force required for direct drilling operation.

The pressing force of the furrow opener 80 is specified by the pneumatic actuator 72 and could be changed by means of a controllable pneumatic control device 92 that can be controlled by the operator from the cabin 18 via an interface (e.g. a virtual terminal, not shown), and a bus line (not shown) or by an automatic mechanism for adjustment to the respective conditions on the field. The pneumatic actuator 72 could also be replaced or supplemented by a spring (not shown) connected in parallel thereto.

It should be noted that further refinements of the seeder 36 are conceivable. Thus the crossbeam 58 could be composed of multiple sections, which makes it possible to move outer sections with sowing units 70 attached thereto into a non-operating position, offset upward and inward, for road travel. A fertilizer tank, the contents of which would be introduced by suitable known pneumatic conveyance means successively into the above-mentioned additional furrow, could be mounted at the front side of the tractor 10.

What is claimed is:

1. Combination of a tractor and a seeder suitable for direct drilling mounted on a three-point hitch of the tractor, wherein the seeder has a crossbeam which is connected to the three-point hitch and on which a plurality of sowing units are arranged laterally, one alongside another, the sowing units each being equipped with a frame, on which a seed container, a furrow opener, a depth adjusting wheel, a seed delivery device and a metering device are arranged, wherein the metering device is designed to successively remove seeds from the seed container and supply it to the seed delivery device, which discharges the seed into a furrow produced by the furrow opener, the depth of the furrow being determined by the depth-adjusting wheel and the sowing units being prestressed downward in relation to the crossbeam by an actuator, and wherein the three-point hitch includes a lower link that can be adjusted in height via a double-acting hydraulic cylinder, and the hydraulic cylinder can be self-locked by a valve during the sowing operation, wherein the seeder is supported only on the three-point hitch and on depth-adjustment wheels of the sowing units, such that, during the sowing operation, pressing forces for the furrow openers are introduced via the chassis, the three-point hitch, the crossbeam and the actuator to the sowing units;

wherein the actuator is one of a pressing hydraulic and pressing pneumatic cylinder to which a predetermined pressure can be applied;

wherein the frame is mounted on the crossbeam via an adjustable parallelogram comprising two links, and the actuator is coupled to the crossbeam;

wherein the actuator is controlled by a control device for changing the pressing forces of the furrow openers, wherein the control device is controlled by an operator in a cabin of the tractor via an interface.

\* \* \* \* \*